J. L. CREVELING.
ELECTRIC SYSTEM.
APPLICATION FILED MAR. 16, 1910.
1,176,035. Patented Mar. 21, 1916.
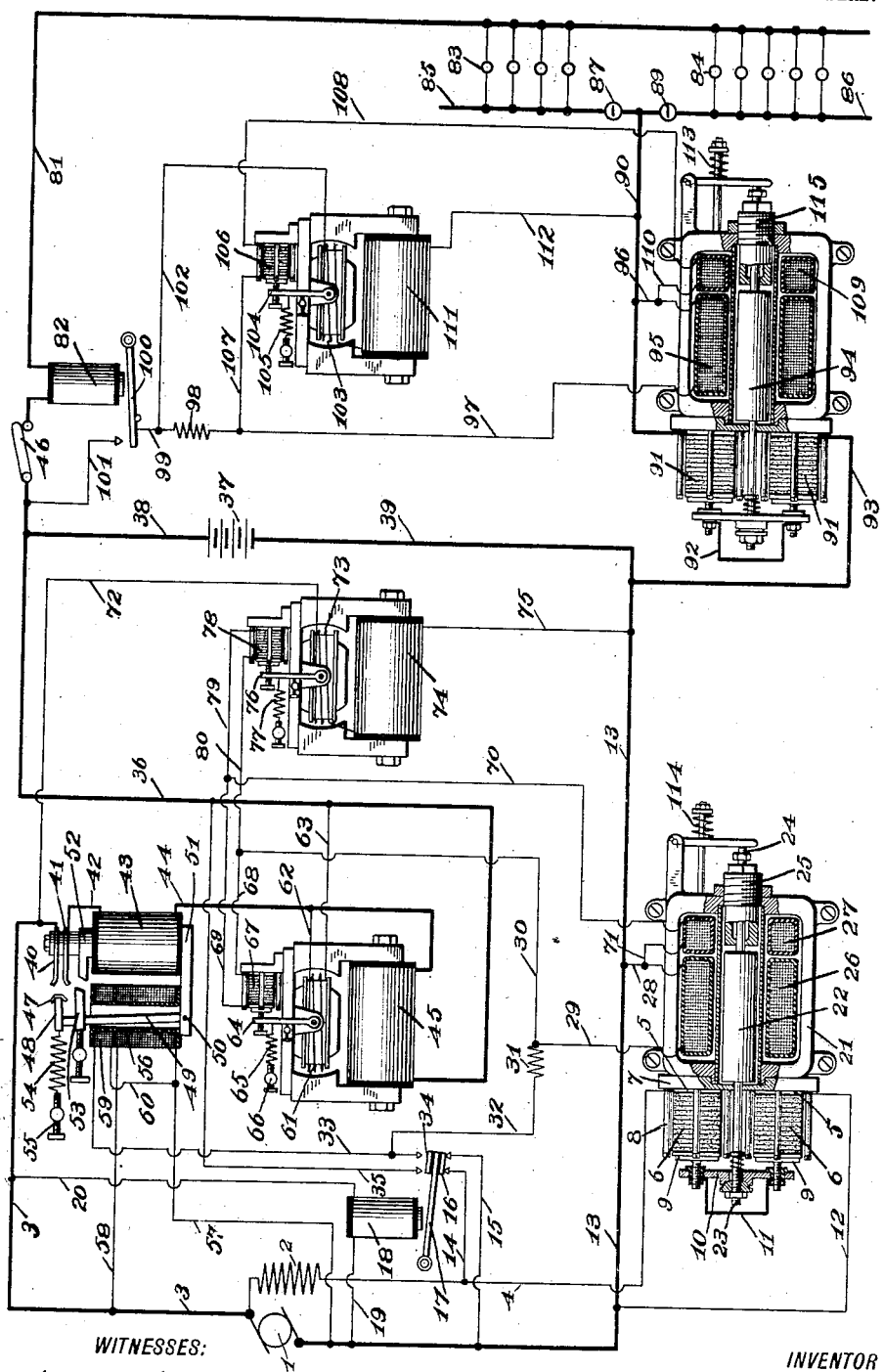
WITNESSES:
H. Crocheron
E. Hall
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC SYSTEM.

1,176,035.      Specification of Letters Patent.      Patented Mar. 21, 1916.

Application filed March 16, 1910. Serial No. 549,576.

*To all whom it may concern:*

Be it known that I, JOHN L. CREVELING, a resident of New York, in the county and State of New York, have invented certain new and useful Improvements in Electric Systems, as set forth in the annexed specification and drawing, forming a part thereof.

My invention pertains to that class of electric systems wherein it is desired to automatically control the operation of the same.

My invention has for its particular object to provide a system wherein a generator driven at variable speeds and subject to stops may be used to supply current to charge a storage battery and operate the lamps or translating devices in connection therewith.

A further object of my invention is to automatically govern the generator so that the battery will be charged in a desired manner and to connect the generator with the battery circuit when its voltage shall equal that of the battery circuit and open the same when its voltage shall fall very slightly below that of the battery or, in other words, open and close the generator circuit at practically no difference of potential across the break and to hold the voltage upon the translating devices practically constant throughout various changes necessary in generator voltage as will hereinafter be explained.

A further object of my invention is to provide means whereby the various automatic instrumentalities used for regulating the system will not consume energy when in inoperative condition.

The drawing is a diagrammatic representation of one type of system embodying the essentials of my invention.

In the drawing 1 represents a dynamo or generator provided with the usual field coil 2 which has one of its ends connected with the positive lead 3. The other end is carried as by the wire 4 to the contact member 5 in electrical connection with one end of the carbon pile 6 carried upon the insulating base 7 as by means of insulating tubes 8. The opposite end of the said pile is connected with the contact member 9 carried by the yoke 10 and insulated therefrom as shown. The said member 9 is electrically connected as by the wire 11, connected to the screws 9ᵃ with the lower member 9 in contact with the lower carbon pile 6 which is connected with the lower member 5 from which the wire 12 is led to the negative lead 13 of the generator. Therefore, the carbon piles 6 are in series with the field circuit and as their resistance will vary as the pressure upon them is varied, the voltage of the generator may be regulated by varying the pressure upon the piles 6 as will hereinafter more plainly appear. The carbon piles 6 are short-circuited at predetermined times by the wires 14 and 15 which under conditions to be explained may be electrically connected by the member 16 carried by the pivoted armature 17.

18 is an electromagnet in shunt across the generator by wires 19 and 20 and adapted to lift the armature 17 and break the contact at 16 when the generator has any appreciable voltage.

21 is a magnet frame carrying the insulating base 7 and carbon piles supported thereby and provided with a movable core 22 supported by the rods 23 and 24 of brass or other non-magnetic material in such manner that motion in a right-hand direction will cause the pressure upon the carbon piles 6 to be increased in an obvious manner. The rod 24 passes through the plug 25 of magnetic material and is normally pressed in a left-hand direction by the spring 114 which tends to lessen the pressure upon the carbon piles 6.

26 represents a coil surrounding the core 22 which when energized causes the same to be drawn toward the plug 25 in a well-known manner.

27 is a coil adapted to oppose the action of coil 26 as will be explained. The coil 26 has one of its ends connected with the lead 13 by wire 28 and the other end of the said coil is carried by wire 29 to the wire 30 which is in communication with one end of the resistance 31, the other end of which is carried by the wire 32 to the wire 33 which is adapted to be connected with the wire 35 by the contact member 34 when the magnet 18 raises the armature 17 and breaks the connection at 16. The wire 35 is carried to the main 36 which is connected with the positive side of the storage battery 37 as by wire 38, the negative side of the battery being connected as by wire 39 with the lead 13. The positive lead 3 of the generator is carried to the contact member 40 of the main switch adapted to control the generator circuit and provided with a like contact member 41 insulated from the member 40 and connected as by wire 42 with one end of the winding upon the series magnet 43. The other end of said winding is carried as by wire 44 to one end of the electromagnet 45 the opposite end of which is connected to the main 36 which terminates in the switch 46.

47 is a contact member carried by the insulating member 48 supported upon the movable core 49 pivotally connected as at 50 with the yoke 51 in such manner that attraction between the pole pieces 52 and 53 against the action of the spring 54 adjustable as by screw 55 will tend to cause the contact member 47 to establish electrical connection between members 40 and 41 and close the generator circuit.

56 is a winding for energizing the core 49 and in shunt across the generator as by wires 57 and 58.

59 is a winding adapted to oppose the winding 56 for a purpose which will hereinafter be explained and has one of its ends connected with the wire 57 as by wire 60 and the other end connected with the wire 33.

61 is a coil movably suspended within the magnetic field of the magnet 45 and connected across the said magnet as by means of wires 62 and 63. The coil 61 is so suspended and connected with the lever 64 that when energized it will tend to turn in a right-hand direction and swing the lever 64 against the action of spring 65 adjustable as by screw 66.

67 is a small carbon pile which will be compressed and have its resistance lowered by motion given to the lever 64 in a right-hand direction. One end of the carbon pile 67 is connected as by wire 68 with the wire 30. The other end of the pile 67 is connected as by wire 69 with the wire 70 which is carried to one end of the winding 27, the other end of which is connected as by wire 71 with the wire 28. The wire 72 is carried from the lead 3 to the movable coil 73 within the field of the electromagnet 74 and may be connected in series therewith, and the opposite end of the coil of said magnet 74 is carried to the lead 13 as by wire 75. The coil 73 is arranged in such manner that it may turn slightly and swing the lever 76 against the action of spring 77 to compress the carbon pile 78, one end of which is in connection with the wire 70 as by the wire 79 and the other end of which is connected as by wire 80 with the wire 30. One side of the switch 46 is adapted to be connected with the main 81 through series magnet 82 and the main 81 is carried to one side of the lamps or translating devices shown as divided in groups 83 and 84. The opposite sides of these groups are connected with the mains 85 and 86 respectively which are connected with the main 90 through manually actuated switches 87 and 89 respectively. The main 90 is carried to the upper carbon pile 91 electrically connected with the lower carbon piles 91 as by means of wire 92, the opposite end of the lower pile being connected as by wire 93 with the lead 13.

94 represents a movable core adapted when moved in a right-hand direction against the action of spring 113 to lessen the resistance of the piles 91. This core is surrounded by a winding 95, one end of which is connected with the main 90 as by wire 96 and the other end of which is connected as by the wire 97 with one end of the resistance 98, the other end of said resistance being connected as by wire 99 with the movable armature 100 adapted when attracted by the magnet 82 to cause connection between 99 and wire 101 which is carried to the main 36. The wire 102 is carried from the wire 99 to the movable coil 103 adapted to swing the lever 104 against the action of the spring 105 so as to tend to exert pressure upon the carbon pile 106, one end of which is connected as by wire 107 with the wire 97 and the other end of which is connected as by the wire 108 with one end of the winding 109, the opposite end of which winding is connected by the wire 110 to the wire 96. The coil 109 is so wound as to oppose coil 95. The coil 103 may be in series with the electromagnet 111 which may have its remaining terminal connected as by wire 112 with the main 90.

The operation of my improved electric system is substantially as follows: If the generator be at rest the main switch will be open at contact members 40, 41 and 47 of that switch and no current will flow back from the battery 37 through the generator and if the manually actuated switch 46 be open no current can flow to the lamps or translating devices nor will any be wasted in any of the lamp regulator circuits inasmuch as the same are broken at the contact 99—100—101. However, if the switch 46 be closed the translating devices may be thrown in or out of circuit as desired by manipulation of the various switches governing the circuits or independent devices as indicated at 87 and 89. If 46 be closed and the switch 87, for example, be closed current will flow from the battery 37 through the wire 38 to the main 36, through the switch 46, magnet 82 and main 81 to the devices 83, thence to 85, switch 87 and main 90 through carbon piles 91 to main 93, then to main 39 and battery 37. This will energize the magnet 82 and cause the same to lift the armature 100 and cause electrical connection between the wires 101 and 99. This will allow current to flow from the main 36 through wire 101, wire 99, resistance 98, wire 97, coil 95 and wire 96 to the main 90. This current will energize the coil 95 and cause the core 94 to be attracted toward the core 115 in a well-known manner and I so adjust the core 115 as to leave the air gap between the cores small and exert a considerable pressure upon the carbon piles 91 connected with the movable core 94. Current will also tend to flow from the wire 97 through wire 107, pile 106, wire 108, coil 109, wire 110 and wire 96 to the main 90. This current, if shunted away from the coil 95 below the resistance 98, will tend to weaken the magnet 95 and lessen the pressure upon the carbon piles 91. This weakening effect is augmented by the current in the coil 109 which is so wound that its magneto-motive force opposes that of the coil 95. The amount of current which shall be shunted away from the coil 95 is determined by the resistance 106 and this is controlled by current flowing from wire 99 through wire 102, swinging coil 103, magnet 111 and wire 112 to the main 90. As this circuit is across the lamp mains, the current flowing therein will depend upon the voltage across the said mains and I so adjust the spring 105 that when a certain normal voltage is reached across the mains, the swinging tendency of the coil 103 will overcome the spring 105 and move the lever 104 to compress and lessen the resistance of the pile 106 which in turn will weaken the pressure upon the carbon piles 91 exerted by the coil 95 and core 94 and increase the resistance thereof in such manner as to hold the voltage across the translation circuit constant throughout rises in voltage across the battery. If now the generator be started current will flow from the main 3 through the field coil 2, wire 4, wire 14, contact 16, wire 15 and main 13 to the generator causing the field to build up in a well-known manner. As soon as the generator attains an appreciable voltage as, for example, twenty per cent. of its normal voltage, the current flowing from the lead 3 through wire 20, magnet 18 and wire 19 to the lead 13 will energize the magnet 18 sufficiently to cause the armature 17 to be raised and break contact at 16 and close the connection between wires 33 and 35 by means of contact member 34. This will break the short-circuit across the field and at the same time allow current to flow from the battery 37 through the wire 38, main 36, wire 35, contact 34, wire 32, resistance 31, wire 29, coil 26 and wire 28 to the lead 13. The current in the coil 26 will cause the core 22 to be drawn toward the core 25 in a well-known manner and through the instrumentality of the rod 23, yoke 10 and members 9, the carbon piles 6 may be compressed and their resistance reduced to a minimum and the resistance then in circuit with the field 2 may be substantially the same as when the short-circuit 14—16—15 was across this resistance for, if desired, the resistance of this short circuit may be made to equal the resistance of the carbon pile 6 when compressed. The closing of the circuit 33—34—35 will also allow current to flow from the battery through main 36, wire 35, contact 34, wire 33, coil 59, wire 60, wire 57, lead 13 and wire 39 to the battery. This current will depend upon the voltage of the battery 37 and tends to set up a magnetomotive force opposed to that set up in the coil 56 which is in connection across the generator as by wires 58 and 57. I now adjust the spring 54 so that when the voltage across the generator is substantially equal to that across the battery the pole piece 53 will be drawn toward the pole piece 52 and the contact 40—47—41 closed. This will connect the generator with the battery and if the generator speed be slightly increased so that its voltage be above that of the battery, current will flow through the lead 3, contact 40—47—41, wire 42, coil 43, wire 44, magnet 45, main 36, wire 38, battery 37, wire 39 and lead 13 to the generator. This current in the coil 43 will tend to more strongly attract the pole piece 53 and hold the switch closed. The current flowing through the winding of the magnet 45 will cause the same to be energized and current flowing through the swinging coil 61 will also cause the same to be energized and tend to turn in a right-hand direction so as to swing the lever 64 against the action of spring 65 and decrease the resistance of the pile 67.

If the translating devices intended for use in the system be all on and the voltage of the battery be fairly low and the generator have its speed increased, a point will be reached when the maximum current desired to be taken from the generator will be flowing through the coil of the magnet 45 and I now adjust the spring 65 so that under these conditions the coil 61 will swing the lever 64 and lessen the resistance of the pile 67 and allow a considerable increase in current to flow through wire 30, wire 68, pile 67, wire 69, wire 70, coil 27 and wire 71 to wire 28. This current will be shunted away in such manner as to weaken the current in the coil 26 and strengthen the current in the opposing coil 27 so as to lessen the pull upon the core 22 and lessen the compression upon the carbon piles 6 and increase the resistance in the field circuit in such manner as to prevent any further rise in current delivered from the generator. If now some of the load be thrown off the translation circuit while the batteries continue to be charged their voltage will rise until a desired maximum charging voltage is reached and as this voltage is measured by the coils 73 and 74 across the circuit, I now adjust the spring 77 so that when this voltage is reached the swinging coil 73 will cause the lever 76 to compress the carbon piles 78 and reduce the resistance thereof and thus increase the current shunted away from the winding 26 and passing through the opposing winding 27 to weaken the same and increase the resistance in the field circuit. Therefore, the generator voltage will not rise above this predetermined point even though less current be taken from it and the effect of the current controlled by the carbon piles 67 be diminished. If the batteries be charged for sometime at this voltage their voltage will rise until there will be practically no current delivered to the battery and the generator will be run as a constant potential generator until sufficient current be consumed in the system to cause the output of the generator to again reach the maximum when the current regulating device will again come into action and prevent excess above this limit. Throughout the above mentioned rise in voltage the potential across the translating devices 83 and 84 will be held constant by the action of the lamp regulator as described earlier in the above specification. If now, while the voltage across the battery be high, the generator slows down until its voltage is slightly less than that of the battery, a slight back discharge through the magnet 43 will cause the pole piece 53 to be repelled in a well-known manner and the contact 40—47—41 broken and the generator thrown out of circuit. If now the generator voltage rises again, while the voltage across the battery still remains high, the action of the coil 59 in opposing the coil 56 will be greater than when the battery voltage was lower and the switch will not close until substantially the battery voltage is reached across the generator. In other words, the coil 59 tends to cause the voltage necessary to close the main switch to be substantially equal to that of the battery throughout certain practical ranges. If now the generator shall slow down and the main switch have opened the circuit and then the generator be brought to rest, the magnet 18 will release the armature 17 and break the connection at 34 and prevent any waste of current flowing from the storage battery through the circuits 35, 33, 59, 60, 57 and 35, 33, 32, 31, 29, 26 and 28 and at the same time short-circuit the carbon piles 6 in such manner that the generator will build up at a low speed. If now the lamps be thrown off at their individual switches while the switch 46 remains closed the magnet 82 will release the armature 100 and prevent waste of current flowing through wires 101 and 99 and the multiple circuits connected therefrom to the main 90. If now the lamps be thrown on again the operation of the lamp regulator to hold the voltage constant may be readily followed from the above and the operation of the generator together with its regulating means and automatic switches may be easily followed from the above description.

I do not wish in any way to limit myself to the exact construction or exact details of operation set forth in the above specification, which is the description of one type of system embodying the essentials of my invention in which system considerable alteration may be made without departing from the spirit of my invention which is as set forth in the following claims.

1. An electric system comprehending a generator; a regulator for the generator; a main switch adapted to control the generator main circuit; and a storage battery; combined with means for controlling the action of the main switch dependent upon the voltage of the battery; together with means, for modifying the action of the generator regulator, in shunt across the same and in circuit with the switch controlling means; and means for governing the action of said last-named modifying means dependent upon the operation of the generator.

2. An electric system comprehending a generator, a regulator for the same, electromagnetic means for operating said regulator, voltage actuated means for affecting said electromagnetic means, means affected by the output of the generator for affecting said electromagnetic means and automatic means dependent upon the operation of the generator for controlling said electromagnetic means.

3. An electric system comprehending a generator, a regulator for the same, electromagnetic means for operating said regulator, voltage actuated means for affecting said electromagnetic means, means affected by the output of the generator for affecting said electromagnetic means and automatic means dependent upon the operation of the generator for controlling said electromagnetic means and nullifying the effect of said regulator.

4. The combination with a generator, a supply circuit, a storage battery, circuit controlling means for controlling the connection of the generator with said supply circuit, a translation circuit deriving current from the battery and from the supply circuit, voltage operated means for controlling the voltage upon said supply circuit, means for automatically operating the circuit controlling means, and additional means for controlling the point of operation thereof causing the same to close at voltages substantially equal to that across the supply circuit throughout changes therein.

5. The combination with a generator and a supply circuit, of means for regulating the generator comprehending electromagnetic means tending to increase the generator output, electromagnetic means tending to decrease the generator output, means for governing both of said electromagnetic means depending upon voltage fluctuations; together with means for governing both of said electromagnetic means depending upon current fluctuations in the supply circuit.

6. An electric system comprising a circuit; a pair of sources of electrical energy therefor; a regulator associated with one of said sources; means for connecting said sources together comprising an element influenced by one of said sources and an element influenced by the other of said sources; and means controlled by one of said sources for putting said elements into operative relation with their respective sources and simultaneously putting the regulator in operative relation with the circuit.

7. An electric system comprising a circuit; a pair of sources of electrical energy therefor; means comprising an element influenced by one of said sources and an element influenced by the other of said sources for connecting said sources together; and a switching device controlled by one of said sources for putting each of said sources into operative relation with the element influenced thereby.

8. An electric system comprising a generator; a circuit therefor; a regulator for said generator; a coil for operating said regulator; a second coil for opposing the effect of the first coil; and controlling means comprising a current-responsive device and a voltage-responsive device for said second coil.

9. An electric system comprising a generator; a circuit; a regulator associated with the generator; a coil for operating the regulator; a second coil for operating the regulator in opposition to the first coil; a pair of resistances associated with said second coil; current-responsive means for affecting one of said resistances; and voltage-responsive means for affecting the other of said resistances for controlling said second coil.

JOHN L. CREVELING.

Witnesses:
E. HALL,
M. HERSKOVITZ.

Copies of this patent may be obtained for five cents each, by addressing the "Commissioner of Patents, Washington, D. C."